(12) United States Patent
Niu et al.

(10) Patent No.: US 11,224,023 B2
(45) Date of Patent: Jan. 11, 2022

(54) TIMING ADVANCE FOR GRANTLESS UPLINK TRANSMISSION

(71) Applicant: Apple Inc., Cupertino, CA (US)

(72) Inventors: Huaning Niu, San Jose, CA (US); Jeongho Jeon, San Jose, CA (US); Wenting Chang, Beijing (CN); Jinyu Zhang, Beijing (CN); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 16/648,653

(22) PCT Filed: Jul. 13, 2018

(86) PCT No.: PCT/US2018/042170
§ 371 (c)(1),
(2) Date: Mar. 18, 2020

(87) PCT Pub. No.: WO2019/014642
PCT Pub. Date: Jan. 17, 2019

(65) Prior Publication Data
US 2020/0245278 A1      Jul. 30, 2020

(51) Int. Cl.
*H04W 56/00* (2009.01)
*H04W 74/08* (2009.01)
*H04W 80/08* (2009.01)

(52) U.S. Cl.
CPC .............. *H04W 56/0005* (2013.01); *H04W 56/0045* (2013.01); *H04W 74/0808* (2013.01); *H04W 80/08* (2013.01)

(58) Field of Classification Search
CPC ......... H04W 56/0005; H04W 56/0045; H04W 74/0808; H04W 80/08; H04W 56/00; H04W 56/005; H04W 56/001
See application file for complete search history.

(56) References Cited

U.S. PATENT DOCUMENTS

| | | | |
|---|---|---|---|
| 2018/0152907 A1* | 5/2018 | Zhang | H04B 7/0421 |
| 2018/0206262 A1* | 7/2018 | Cao | H04W 56/0005 |
| 2019/0342037 A1* | 11/2019 | Karaki | H04L 1/1854 |
| 2020/0015263 A1* | 1/2020 | Huang | H04L 41/0813 |

OTHER PUBLICATIONS

Lenovo et al: "UL eMBB transmission multiplexing with UL URLLC", 3GPP Draft; R1-1702666, France, vol. RAN WG1, No. Athens, Greece; Feb. 12, 2017 (Year: 2017).*

* cited by examiner

*Primary Examiner* — Afshawn M Towfighi
(74) *Attorney, Agent, or Firm* — Sterne, Kessler, Goldstein & Fox P.L.L.C.

(57) ABSTRACT

Described is an apparatus of an Evolved Node-B (eNB) operable to communicate with a User Equipment (UE) on a wireless network. The apparatus may comprise a first circuitry and a second circuitry. The first circuitry may be operable to determine a first Timing Advance (TA) for Scheduled Uplink (SUL) transmission. The circuitry may also be operable to determine a second TA for Grantless Uplink (GUL) transmission. The second circuitry may be operable to generate an SUL transmission for transmission at a timing based upon the first TA. The second circuitry may also be operable to generate a GUL transmission for transmission at a timing based upon the second TA.

24 Claims, 11 Drawing Sheets

TIMING ADVANCE FOR GRANTLESS UPLINK TRANSMISSION

CLAIM OF PRIORITY

The present application claims priority under 35 U.S.C. § 365(c) to Patent Cooperation Treaty International Patent Application Number PCT/CN2017/093006 filed Jul. 14, 2017 and entitled "DESIGN AND APPARATUS FOR TIMING ADVANCE FOR GRANTLESS UPLINK (GUL) TRANSMISSION," which is herein incorporated by reference in its entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/ 5G mobile networks system. Next-generation wireless cellular communication systems may provide support for higher bandwidths in part by using unlicensed spectrum.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
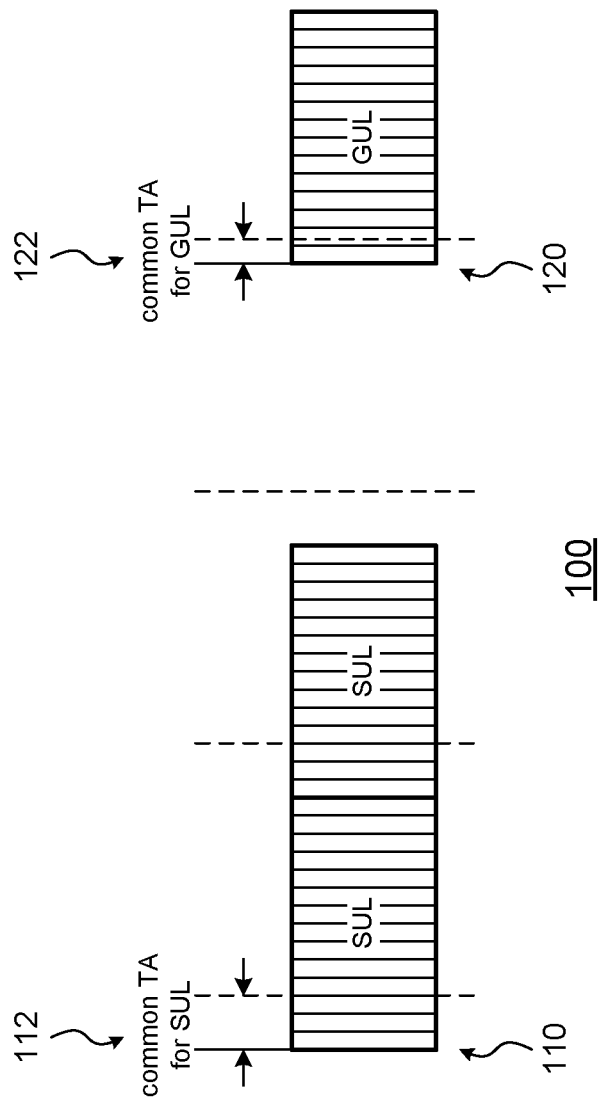
FIG. 1 illustrates a scenario of different common Timing Advance (TA) for Grantless Uplink (GUL) and Scheduled Uplink (SUL), in accordance with some embodiments of the disclosure.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

Due to the popularity of mobile devices and smart devices, the widespread adoption of wireless broadband has resulted in significant growth in the volume of mobile data traffic and has radically impacted system requirements, sometimes in divergent ways. For example, while it may be important to lower complexity, elongate battery life, and support highly mobility and service continuity of devices, it may also be important to increase data rates and bandwidths and lower latencies to support modern applications.

To meet the needs of future wireless networks, various physical layer techniques have been introduced (e.g, Multiple Input Multiple Output (MIMO) techniques, enhanced Inter-Cell Interference Coordination (ICIC) designs, coordinated multi-point designs, and so on). An increasing interest has also arisen in operating cellular networks in unlicensed spectrum to ameliorate the scarcity of licensed spectrum in low frequency bands, with the aim to further improve data rates. One enhancement for LTE in 3GPP Release 13 has been to enable operation in unlicensed spectrum via Licensed-Assisted Access (LAA), which may expand a system bandwidth by utilizing a flexible carrier aggregation (CA) framework introduced by the LTE-Advanced system. Enhanced operation of LTE systems in unlicensed spectrum is also expected in future releases, as well as in 5G systems.

Potential LTE operations in unlicensed spectrum may include (but not be limited to) LTE system operation in the unlicensed spectrum via Dual Connectivity (DC) (e.g., DC-based LAA), as well as LTE-based technology operating solely in unlicensed spectrum without relying upon an "anchor" in licensed spectrum (such as in MulteFire™ technology by MulteFire Alliance of Fremont Calif., USA).

Standalone LTE operation in unlicensed spectrum may combine performance benefits of LTE technology with a relative simplicity of Wi-Fi®-like deployments. (Wi-Fi® is a registered trademark of the Wi-Fi Alliance of Austin, Tex., USA.) Standalone LTE operation may accordingly be an advantageous technology in meeting demands of ever-increasing wireless traffic.

Standalone LTE operation (such as MulteFire™ operation) may extend LTE operation to unlicensed spectrum without an anchor in licensed spectrum, but due to performance loss caused by pairs of Listen-Before-Talk (LBT) procedures in a schedule-based Uplink (UL) transmission mode, a grantless UL transmission mode may be advantageous.

In various embodiments, Grantless Uplink (GUL) may be enabled during the gap of one transmission opportunity (TxOP), inside an eNB's acquired Maximum Channel Occupancy Time (MCOT), and outside an eNB's acquired MCOT. In such scenarios, a Timing Advance (TA) of GUL may be disposed to being specified for various applications. In various embodiments, co-existence between SUL and GUL, both inside and outside an MCOT, may be addressed.

Discussed herein are mechanisms and methods for supporting TA for GUL. Some embodiments may pertain to GUL inside an eNB's acquired MCOT. Some embodiments may pertain to GUL inside a gap within an MCOT. Some embodiments may pertain to GUL outside an eNB's acquired MCOT. Various embodiments may also pertain to co-existence between SUL and GUL.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Transmission of an Uplink (UL) radio frame number i from the UE may start $(N_{TA}+N_{TAoffset}) \times T_s$ seconds before the start of the corresponding Downlink (DL) radio frame at the UE, where $0 \leq N_{TA} \leq 4096$ if the UE is configured with a Secondary Cell Group (SCG) and $0 \leq N_{TA} \leq 20512$ otherwise. In various embodiments, for frame structure type 1, $N_{TAoffset}=0$, and/or for frame structure type 2, $N_{TAoffset}=624$. In some embodiments, one or more alternate predetermined values may be specified (e.g., a 3GPP specification).

For a cell capable of standalone LTE operation (e.g., MulteFire™ operation), $N_{TAoffset}$ may be derived from a common TA parameter (e.g., mf-CommonTimingAdvanceOffset), which may in turn be configured by a higher layer. The common TA may be established in accordance with Table 1 below.

TABLE 1

An example of common TA

| mf-CommonTimingAdvanceOffset | Value |
|---|---|
| 0 | 0 (default) |
| 1 | 1096 |
| 2 | 1424 |
| 3 | 1700 |
| 4 | 2192 |
| 5 | 3288 |
| 6 | 3616 |
| 7 | 3892 |
| 8 | 4384 |
| 9 | 5480 |
| 10 | 5808 |
| 11 | 6084 |
| 12 | 6576 |
| 13 | 7672 |
| 14 | spare |
| 15 | spare |

In various embodiments, a GUL-specific common TA may be introduced for dedicated GUL transmission (e.g., mf-CommonTimingAdvanceOffset GUL).

FIG. 1 illustrates a scenario of different common TA for GUL and SUL, in accordance with some embodiments of the disclosure. A scenario 100 may comprise one or more SUL subframes 110 and one or more GUL subframes 120. SUL subframes 110 may correspond with a common TA for SUL 112, and GUL subframes 120 may correspond with a common TA for GUL 122.

Configuration of different common TA for GUL may be beneficial in Time-Division Multiplexing (TDM) contexts. Configuration of different common TA for GUL may facilitate and/or allow stage-1 SUL to have a higher priority than GUL when they finish CAT-4 LBT within the same subframe. In some embodiments, a common TA for GUL may be configured to be 16 microseconds (us), which may advantageously facilitate or allow efficient MCOT sharing with DL without LBT. In some embodiments, a common TA for GUL may be configured to be 25 us, which may advantageously facilitate or allow efficient MCOT sharing with DL with one shot LBT.

In some embodiments, when a GUL transmission is performed within an eNB's acquired MCOT, including both TDM and Frequency-Division Multiplexing (FDM), a GUL TA may be determined in various ways. Under a first option, for some embodiments, a common TA of a scheduled Physical Uplink Shared Channel (PUSCH) subframe (e.g., SUL) may be adopted. For example, SUL and GUL without full band configuration may be multiplexed within one subframe at different interlaces. Under a second option, for some embodiments, a common TA dedicated for GUL may be adopted. An eNB may assign a larger TA for SUL, and may configure a smaller TA for GUL, which may give SUL a higher priority. If there is an SUL transmission, a GUL transmission may be blocked due to a failed LBT procedure; otherwise, a GUL with full bandwidth configuration may utilize the subframe.

In some embodiments, when GUL is performed within a gap of an MCOT (include TDM and/or FDM), a GUL TA may be determined in various ways. Under a first option, for some embodiments, a common TA of scheduled PUSCH subframe (e.g., SUL) may be adopted. A unified TA frame structure may then be maintained. Moreover, symbol puncturing may be utilized for co-existence with SUL. This may, however, impact the downlink transmission. Under a second option, for some embodiments, a common TA dedicated for GUL may be adopted. Under a third option, for some embodiments, a TA may be a predefined or otherwise predetermined value (e.g., 25 us, or $1096 \times T_s$ us). Under a fourth option, for some embodiments, there may be no TA for GUL inside the gap.

In some embodiments, when GUL is performed outside an eNB's MCOT (including TDM and/or FDM), a GUL TA may be determined in various ways. Under a first option, for some embodiments, a common TA of scheduled PUSCH subframe (e.g., SUL) may be adopted. A unified TA frame structure may then be maintained. Moreover, symbol puncture may be utilized for co-existence with SUL. Under a second option, for some embodiments, a common TA dedicated for GUL may be adopted (e.g., 16 us, or $1096 \times T_s$). After a GUL ends, an eNB may continue the transmission without LBT, or may wait some time.

In some embodiments, GUL for TDM and GUL for FDM may have different common TA configurations. As one example, GUL users under FDM may use an SUL common TA, and GUL users under TDM may use a GUL dedicated common TA. As another example, GUL users under FDM may use a GUL dedicated common TA, and GUL users under TDM may use an SUL common TA.

For some embodiments, an eNB may configure TA options by higher layer signaling to inform a UE.

A variety of embodiments may pertain to GUL co-existence with SUL. To promote a harmonized environment for SUL, GUL may be configured to not impact SUL transmission as much as possible.

In a variety of embodiments, when GUL is performed within the eNB's acquired MCOT, GUL may be configured in various ways.

In some embodiments, when GUL is performed within the eNB's acquired MCOT, if GUL has the same TA as SUL, the first OFDM symbol may be punctured. In some embodiments, a last OFDM symbol of a given GUL subframe may be punctured to create a gap for LBT of the next subframe, if SUL starts on a symbol having an OFDM index of 0. In some embodiments, an UE-specific starting position of GUL may be between an Orthogonal Frequency-Division Multiplexing (OFDM) symbol 1 and an OFDM symbol 2. In some embodiments, an UE-specific starting position of GUL may be between an OFDM symbol 0 and an OFDM symbol 1. Moreover, some or all of FDM GUL users may have the same starting offset that may be chosen from a UE specific offset, which may be the same value outside the TxOP.

In some embodiments, when GUL is performed within the eNB's acquired MCOT, if the TA of GUL is different than the TA of SUL, one or more beginning GUL OFDM symbols, whose starting time may be earlier than $T_n - N_{TA,SUL} + T_{\#OS0}$, may be punctured, where $T_n$ may be a starting time of a DL subframe n, $N_{TA,SUL}$ may be a common TA of SUL, and $T_{\#OS0}$ may be a period of OFDM symbol 0 (which may include a cyclic prefix (CP)).

Figure 2:
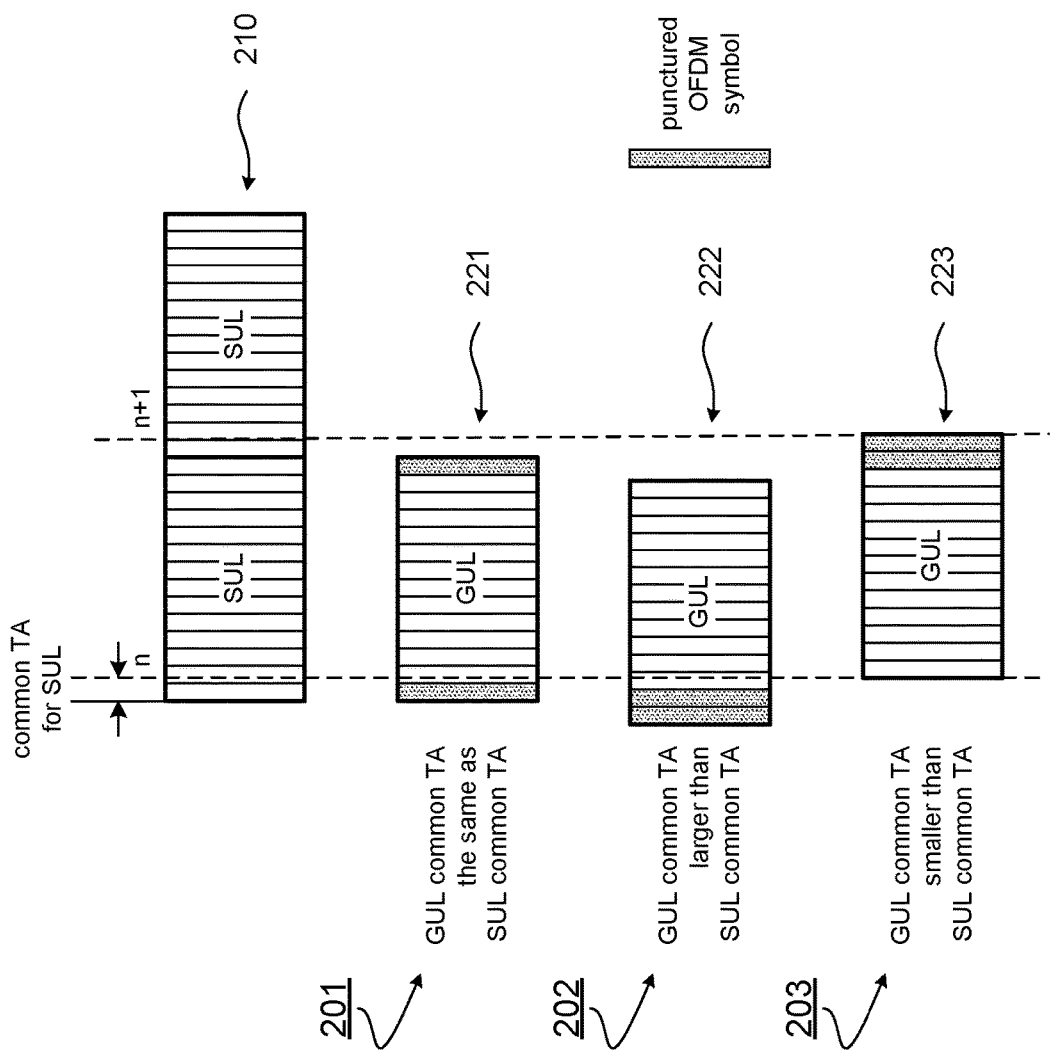
FIG. 2 illustrates a scenario of GUL within an Evolved Node-B's (eNB's) acquired Maximum Channel Occupancy Time (MCOT), in accordance with some embodiments of the disclosure.

FIG. 2 illustrates a scenario of GUL within an eNB's acquired MCOT, in accordance with some embodiments of the disclosure. FIG. 2 depicts one or more SUL subframes 210 in the context of a set of one or more first GUL subframes 221, a set of one or more second GUL subframes 222, and a set of one or more third GUL subframes 223.

A scenario 201 may comprise the one or more SUL subframes 210 and one or more first GUL subframes 221. SUL subframes 210 may correspond with a common TA for SUL, and first GUL subframes 221 may correspond with a first common TA for GUL. In various embodiments, the first common TA for GUL may be the same as the common TA for SUL.

A scenario 202 may comprise the one or more SUL subframes 210 and one or more second GUL subframes 222. SUL subframes 210 may correspond with the common TA for SUL, and second GUL subframes 222 may correspond with a second common TA for GUL. In various embodiments, the second common TA for GUL may be larger than the common TA for SUL.

A scenario 203 may comprise the one or more SUL subframes 210 and one or more third GUL subframes 223. SUL subframes 210 may correspond with the common TA for SUL, and third GUL subframes 223 may correspond with a third common TA for GUL. In various embodiments, the third common TA for GUL may be larger than the common TA for SUL.

In scenario 202, the first two OFDM symbols of one or more of second GUL subframes 222 may be punctured. In scenario 203, the last two OFDM symbols of one or more of third GUL subframes 223 (whose ending time may be later than $T_{n+1} - N_{TA,SUL} + 25$ us) may be punctured.

Figure 3:
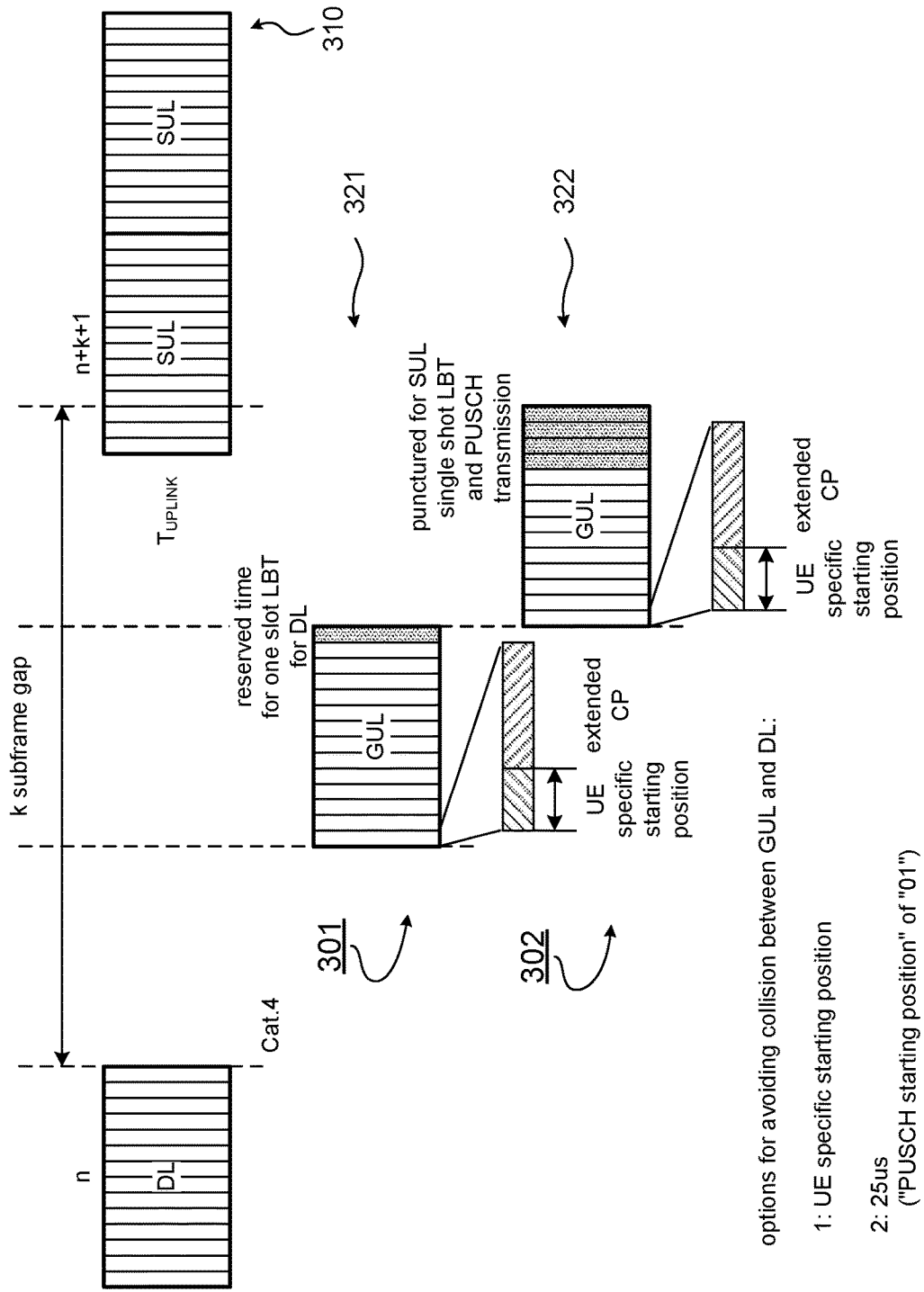
FIG. 3 illustrates a scenario of GUL within a gap of an MCOT without TA, in accordance with some embodiments of the disclosure.

In a variety of embodiments, when GUL is performed within the eNB's acquired MCOT and if there is no TA, GUL may be configured in various ways. FIG. 3 illustrates a scenario of GUL within a gap of an MCOT without TA, in accordance with some embodiments of the disclosure. FIG. 3 depicts one or more SUL subframes 310 in the context of a set of one or more first GUL subframes 321 and a set of one or more second GUL subframes 322.

A scenario 301 may comprise the one or more SUL subframes 310 and the one or more first GUL subframes 321. SUL subframes 310 may correspond with a common TA for SUL, and first GUL subframes 321 may correspond with a first common TA for GUL.

A scenario 302 may comprise the one or more SUL subframes 310 and the one or more second GUL subframes 322. SUL subframes 310 may correspond with the common TA for SUL, and second GUL subframes 322 may correspond with a second common TA for GUL.

In some embodiments, for one or more GUL subframes (up to and including every GUL subframe), OFDM symbol #0 may be configured in a variety of ways. Under a first option, OFDM symbol #0 may start with a UE specific starting position. Under a second option, OFDM symbol #0 may start after 25 us (e.g., similar to a "PUSCH starting position" of "01"), and remaining samples of OFDM symbol #0 may be utilized as an extended CP of OFDM symbol #1. If it is the first GUL subframe after a successful LBT procedure, the remaining samples of OFDM symbol #0 may be utilized as the UE specific starting position. Under a third option, starting after 9 us, remaining samples of OFDM symbol #0 may be utilized as an extended CP of OFDM symbol #1. If it is the first GUL subframe after a successful LBT procedure, the remaining samples of OFDM symbol #0 may be utilized as a UE specific starting position. Under a fourth option, OFDM symbol #0 may be punctured.

In some embodiments, for one or more GUL subframes (up to and including every GUL subframe) except the subframe before the first SUL subframe, OFDM symbol #13 may be punctured.

In some embodiments, for the GUL subframe before the first SUL subframe (e.g., a subframe n+k), the last subframe within the gap may be configured in a variety of ways. Under a first option, as depicted in scenario 301, the last subframe within the gap might not be utilized for GUL transmission. Under a second option, as depicted in scenario 302, if the last subframe within the gap is utilized for GUL transmission, the GUL OFDM symbols whose ending time is later than $T_{uplink} - 25$ us (e.g., 4 OFDM symbols) may be punctured, where $T_{uplink}$ may be a TA of SUL.

Figure 4:
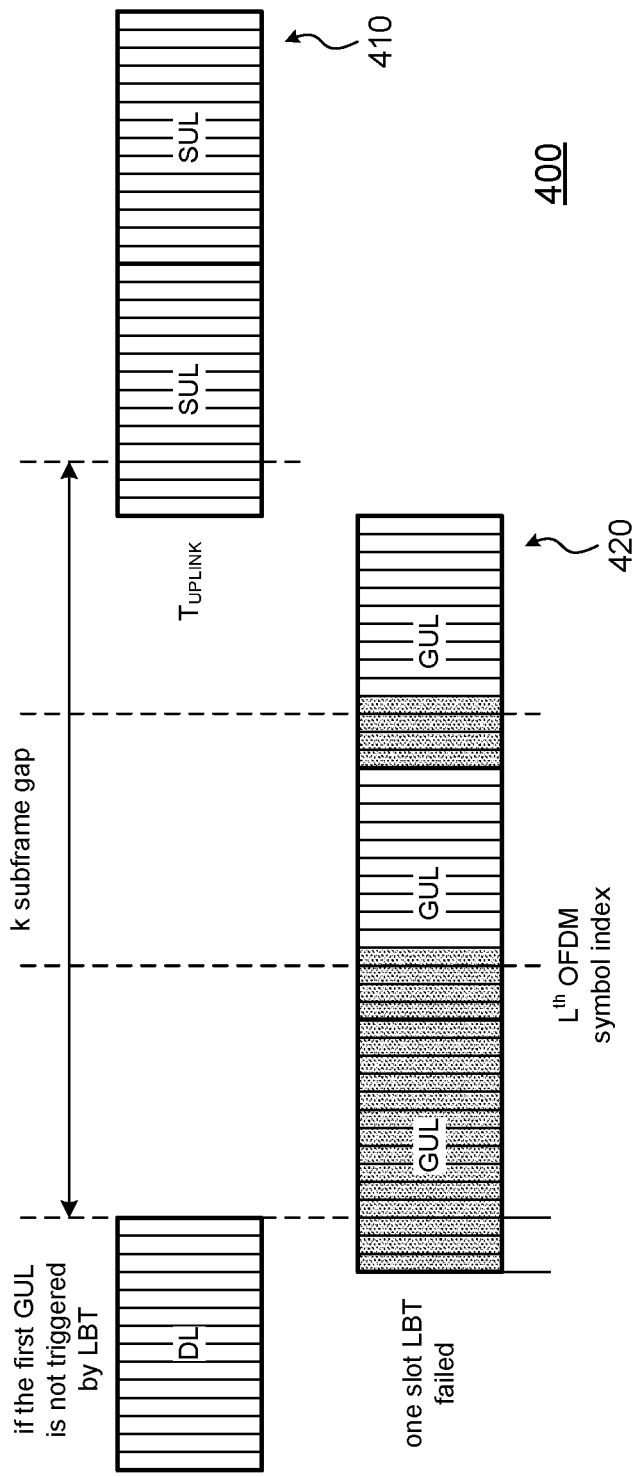
FIG. 4 illustrates a scenario of GUL within a gap of an MCTO, where a TA of the GUL is substantially similar to a TA of an SUL, in accordance with some embodiments of the disclosure.

In a variety of embodiments, when GUL is performed within the eNB's acquired MCOT and if there is a predefined TA, GUL may be configured in various ways. FIG. 4 illustrates a scenario of GUL within a gap of an MCTO, where a TA of the GUL is substantially similar to a TA of an SUL, in accordance with some embodiments of the disclosure. A scenario 400 may comprise one or more SUL subframes 410 and one or more GUL subframes 420. SUL subframes 110 may correspond with a common TA for SUL, and GUL subframes 420 may correspond with a common TA for GUL.

In some embodiments, a parameter n'TA may be configured in a variety of ways (e.g., 16 us, 25 us, or $1096 \times T_s$ us). If a Category 4 LBT is finished after cPDCCH trigger, the first GUL subframe within the gap may be configured in a variety of ways. Under a first option, it may start at a UE offset starting position. The UE offset starting position may be disposed to being larger than ($n'_{TA} + 9$ us) to give higher priority for common Physical Downlink Control Channel (cPDCCH). The remaining REs may be used for extended CP. Under a second option, the ($n'_{TA} + 25$ us) of the first OFDM symbol of this subframe may be punctured, and remaining REs are used for UE specific starting position and/or extended CP. Under a third option, the ($n'_{TA} + 9$ us) of the first OFDM symbol of this subframe may be punctured, and remaining REs may be used for UE specific starting position and/or extended CP. Under a fourth option, the first OFDM symbol of this subframe may be punctured.

In some embodiments, a parameter $n'_{TA}$ may be configured in a variety of ways (e.g., 16 us, 25us, or $1096 \times T_s$ us). If a one slot LBT is finished after a cPDCCH trigger, the GUL first subframe within the gap may be configured in a variety of ways. Under a first option, the ($n'_{TA} + 9$ us) of the first OFDM symbol of this subframe may be punctured, and remaining REs may be used for extended CP. Under a second option, the ($n'_{TA}$+25 us) of the first OFDM symbol of this subframe may be punctured, and remaining REs may be used for extended CP. Under a third option, a first OFDM of this subframe may be punctured.

In some embodiments, a TA parameter $n'_{TA}$ may be used to configure TA in a variety of ways (e.g., 16 us, 25us, or 1096×$T_s$ us). Instead of the first subframe within the gap, the other GUL subframes may be configured in a variety of ways. Under a first option, the ($n'_{TA}$+9 us) of the first OFDM symbol of this subframe may be punctured, and remaining REs may be used for extended CP. Under a second option, the ($n'_{TA}$+25 us) of the first OFDM symbol of this subframe may be punctured, and remaining REs may be used for extended CP. Under a third option, the first OFDM symbol of this subframe may be punctured.

In some embodiments, a parameter $n'_{TA}$ may be configured in a variety of ways (e.g., 16 us, 25us, or 1096×$T_s$ us). For other GUL subframes, instead of the last subframe within the gap, the last OFDM symbol may be configured in a variety of ways. Under a first option, a last OFDM symbol might not be punctured (e.g., $n'_{TA}$>25 us). Under a second option, the last OFDM symbol may be punctured, if ($n'_{TA}$<25us).

In some embodiments, a parameter $n'_{TA}$ may be configured in a variety of ways (e.g., 16 us, 25us, or 1096×$T_s$ us). The last subframe within the gap may be configured in a variety of ways. Under a first option, the last subframe within the gap might not be utilized for GUL transmission. Under a second option, if the last subframe within the gap is utilized for GUL transmission, the GUL OFDM symbols whose ending time is later than $T_{uplink}$−25 us may be punctured, where $T_{uplink}$ may be the TA of SUL (e.g., 3 OFDM symbols, as depicted in FIG. 4.

In a variety of embodiments, when GUL is performed within the eNB's acquired MCOT, GUL may use the same TA as SUL. An Lth OFDM symbol may be aligned with a starting time of DL. OFDM symbols before L may be punctured, samples in the Lth OFDM symbol before the starting time of DL may be punctured, and samples before the starting time plus 9 us or 25 us may be punctured. Remaining REs of the Lth OFDM symbol may be used for UE specific grantless starting position and/or extended CP for the next OFDM symbol. The last OFDM symbol of the last GUL subframe within the gap may be punctured.

In some embodiments, UEs whose TA is smaller than a threshold value (e.g., 25 us) may be allowed to transmit GUL inside a gap of an eNB's acquired MCOT.

Figure 5:
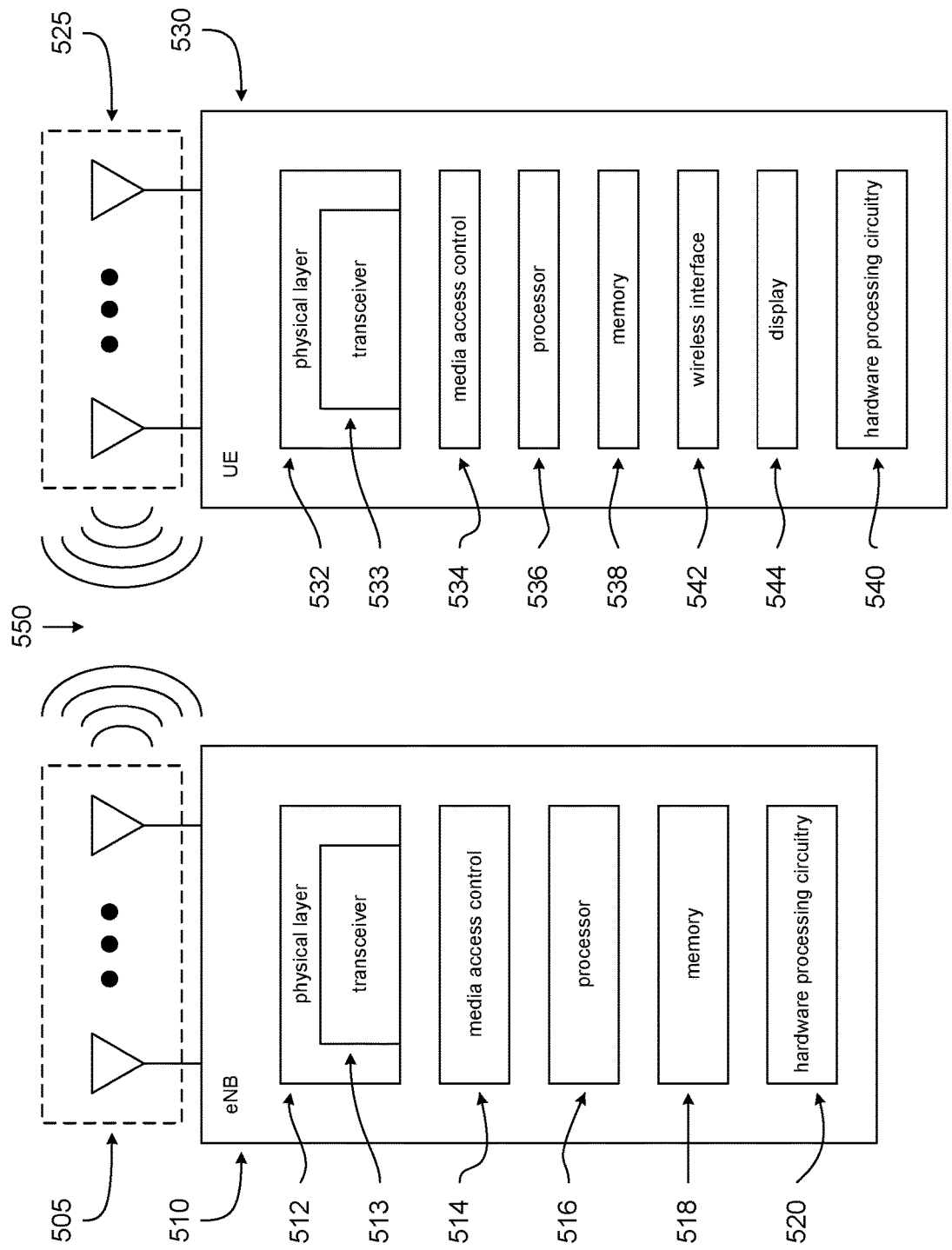
FIG. 5 illustrates an eNB and a User Equipment (UE), in accordance with some embodiments of the disclosure.

FIG. 5 illustrates an eNB and a UE, in accordance with some embodiments of the disclosure. FIG. 5 includes block diagrams of an eNB 510 and a UE 530 which are operable to co-exist with each other and other elements of an LTE network. High-level, simplified architectures of eNB 510 and UE 530 are described so as not to obscure the embodiments. It should be noted that in some embodiments, eNB 510 may be a stationary non-mobile device.

eNB 510 is coupled to one or more antennas 505, and UE 530 is similarly coupled to one or more antennas 525. However, in some embodiments, eNB 510 may incorporate or comprise antennas 505, and UE 530 in various embodiments may incorporate or comprise antennas 525.

In some embodiments, antennas 505 and/or antennas 525 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 505 are separated to take advantage of spatial diversity.

eNB 510 and UE 530 are operable to communicate with each other on a network, such as a wireless network. eNB 510 and UE 530 may be in communication with each other over a wireless communication channel 550, which has both a downlink path from eNB 510 to UE 530 and an uplink path from UE 530 to eNB 510.

As illustrated in FIG. 5, in some embodiments, eNB 510 may include a physical layer circuitry 512, a MAC (media access control) circuitry 514, a processor 516, a memory 518, and a hardware processing circuitry 520. A person skilled in the art will appreciate that other components not shown may be used in addition to the components shown to form a complete eNB.

In some embodiments, physical layer circuitry 512 includes a transceiver 513 for providing signals to and from UE 530. Transceiver 513 provides signals to and from UEs or other devices using one or more antennas 505. In some embodiments, MAC circuitry 514 controls access to the wireless medium. Memory 518 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 520 may comprise logic devices or circuitry to perform various operations. In some embodiments, processor 516 and memory 518 are arranged to perform the operations of hardware processing circuitry 520, such as operations described herein with reference to logic devices and circuitry within eNB 510 and/or hardware processing circuitry 520.

Accordingly, in some embodiments, eNB 510 may be a device comprising an application processor, a memory, one or more antenna ports, and an interface for allowing the application processor to communicate with another device.

As is also illustrated in FIG. 5, in some embodiments, UE 530 may include a physical layer circuitry 532, a MAC circuitry 534, a processor 536, a memory 538, a hardware processing circuitry 540, a wireless interface 542, and a display 544. A person skilled in the art would appreciate that other components not shown may be used in addition to the components shown to form a complete UE.

In some embodiments, physical layer circuitry 532 includes a transceiver 533 for providing signals to and from eNB 510 (as well as other eNBs). Transceiver 533 provides signals to and from eNBs or other devices using one or more antennas 525. In some embodiments, MAC circuitry 534 controls access to the wireless medium. Memory 538 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 542 may be arranged to allow the processor to communicate with another device. Display 544 may provide a visual and/or tactile display for a user to interact with UE 530, such as a touch-screen display. Hardware processing circuitry 540 may comprise logic devices or circuitry to perform various operations. In some embodiments, processor 536 and memory 538 may be arranged to perform the operations of hardware processing circuitry 540, such as operations described herein with reference to logic devices and circuitry within UE 530 and/or hardware processing circuitry 540.

Accordingly, in some embodiments, UE 530 may be a device comprising an application processor, a memory, one or more antennas, a wireless interface for allowing the application processor to communicate with another device, and a touch-screen display.

Elements of FIG. 5, and elements of other figures having the same names or reference numbers, can operate or function in the manner described herein with respect to any such figures (although the operation and function of such elements is not limited to such descriptions). For example, FIGS. 6-7 and 10-11 also depict embodiments of eNBs, hardware processing circuitry of eNBs, UEs, and/or hardware processing circuitry of UEs, and the embodiments described with respect to FIG. 5 and FIGS. 6-7 and 10-11 can operate or function in the manner described herein with respect to any of the figures.

In addition, although eNB 510 and UE 530 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 6:
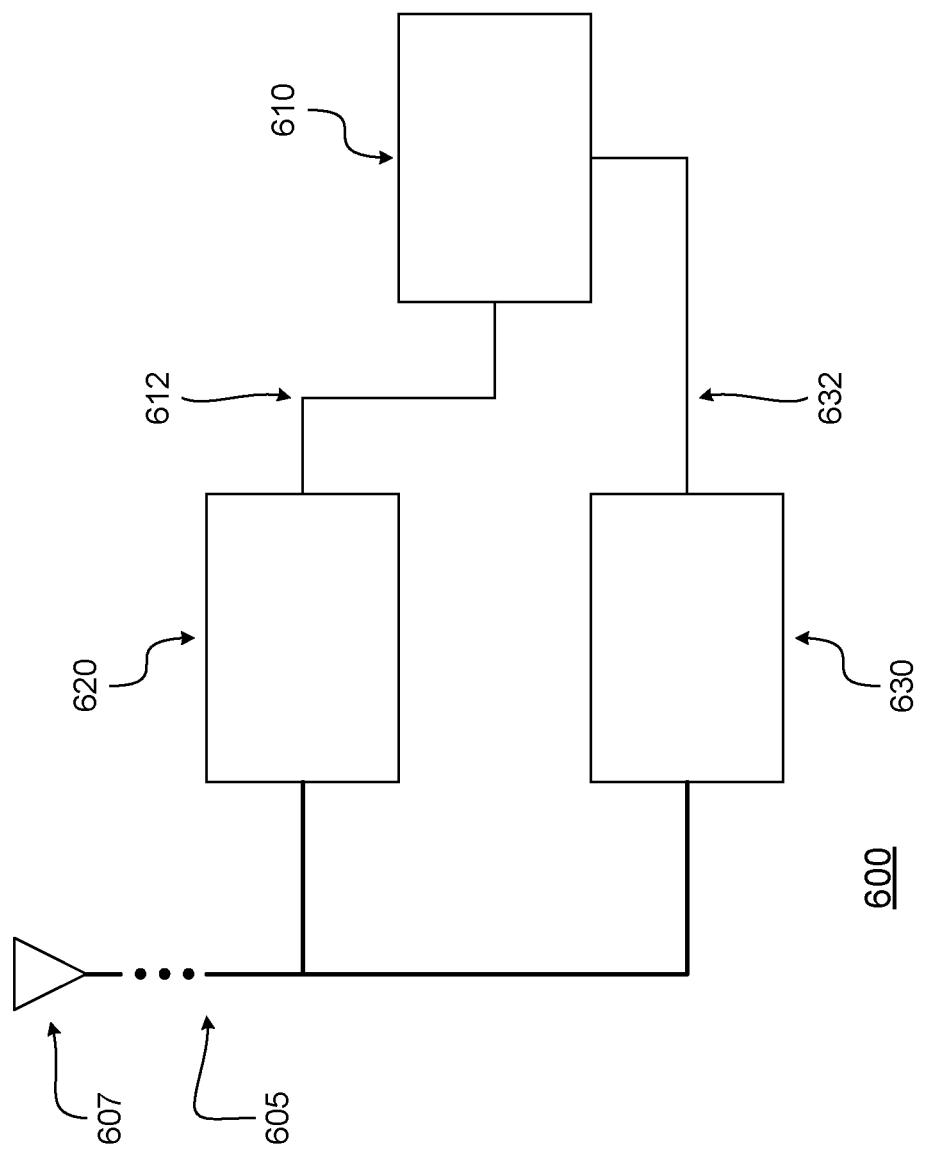
FIG. 6 illustrates hardware processing circuitries for a UE for supporting TA for GUL, in accordance with some embodiments of the disclosure.

FIG. 6 illustrates hardware processing circuitries for a UE for supporting TA for GUL, in accordance with some embodiments of the disclosure. With reference to FIG. 5, a UE may include various hardware processing circuitries discussed herein (such as hardware processing circuitry 600 of FIG. 6), which may in turn comprise logic devices and/or circuitry operable to perform various operations. For example, in FIG. 5, UE 530 (or various elements or components therein, such as hardware processing circuitry 540, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 536 (and/or one or more other processors which UE 530 may comprise), memory 538, and/or other elements or components of UE 530 (which may include hardware processing circuitry 540) may be arranged to perform the operations of these hardware processing circuitries, such as operations described herein with reference to devices and circuitry within these hardware processing circuitries. In some embodiments, processor 536 (and/or one or more other processors which UE 530 may comprise) may be a baseband processor.

Returning to FIG. 6, an apparatus of UE 530 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 550). Antenna ports 605 may be coupled to one or more antennas 607 (which may be antennas 525). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 530 to wireless communication channel 550 (and from there to eNB 510, or to another eNB). Similarly, antennas 607 and antenna ports 605 may be operable to provide transmissions from a wireless communication channel 550 (and beyond that, from eNB 510, or another eNB) to UE 530.

Hardware processing circuitry 600 may comprise various circuitries operable in accordance with the various embodiments discussed herein. With reference to FIG. 6, hardware processing circuitry 600 may comprise a first circuitry 610, a second circuitry 620, and/or a third circuitry 630.

First circuitry 610 may be operable to determine a first TA for SUL transmission. First circuitry 610 may also be operable to determine a second TA for GUL transmission. First circuitry 610 may be operable to provide indicators regarding the first TA and/or the second TA to second circuitry 620 via an interface 612. Second circuitry 620 may be operable to generate an SUL transmission for transmission at a timing based upon the first TA. Second circuitry 620 may also be operable to generate a GUL transmission for transmission at a timing based upon the second TA. Hardware processing circuitry 600 may also comprise an interface for sending the SUL transmission and the GUL transmission to a transmission circuitry, and for receiving a configuration transmission from the eNB.

In some embodiments, third circuitry 630 may be operable to process a configuration transmission from the eNB carrying one or more parameters for GUL transmission. First circuitry 610 may also be operable to determine the second TA based upon the one or more parameters for GUL transmission. Third circuitry 630 may be operable to provide indicators of the one or more parameters for GUL transmission to first circuitry 610 via an interface 612.

For some embodiments, the configuration transmission may be a higher-layer signaling transmission. In some embodiments, the one or more parameters may comprise a common TA for GUL transmission. For some embodiments, the common TA for GUL transmission may have a value indicating 16 microseconds. In some embodiments, the common TA for GUL transmission may have a value indicating 25 microseconds.

In some embodiments, the GUL transmission may be generated for transmission within an acquired MCOT of the eNB, and the SUL transmission and the GUL transmission may be multiplexed within one subframe at different interlaces. For some embodiments, the GUL transmission may be generated for transmission within a gap of one MCOT of the eNB, and the second TA may be determined to be the same as the first TA. In some embodiments, the GUL transmission may be generated for transmission outside an MCOT of the eNB, and the second TA may be determined to be the same as the first TA. For some embodiments, the GUL transmission may be generated for transmission within an acquired MCOT of the eNB, and a last OFDM symbol of a subframe of the GUL transmission may be punctured to create a gap for an LBT procedure for a subsequent subframe.

In some embodiments, first circuitry 610, second circuitry 620, and/or third circuitry 630 may be implemented as separate circuitries. In other embodiments, first circuitry 610, second circuitry 620, and/or third circuitry 630 may be combined and implemented together in a circuitry without altering the essence of the embodiments.

Figure 7:
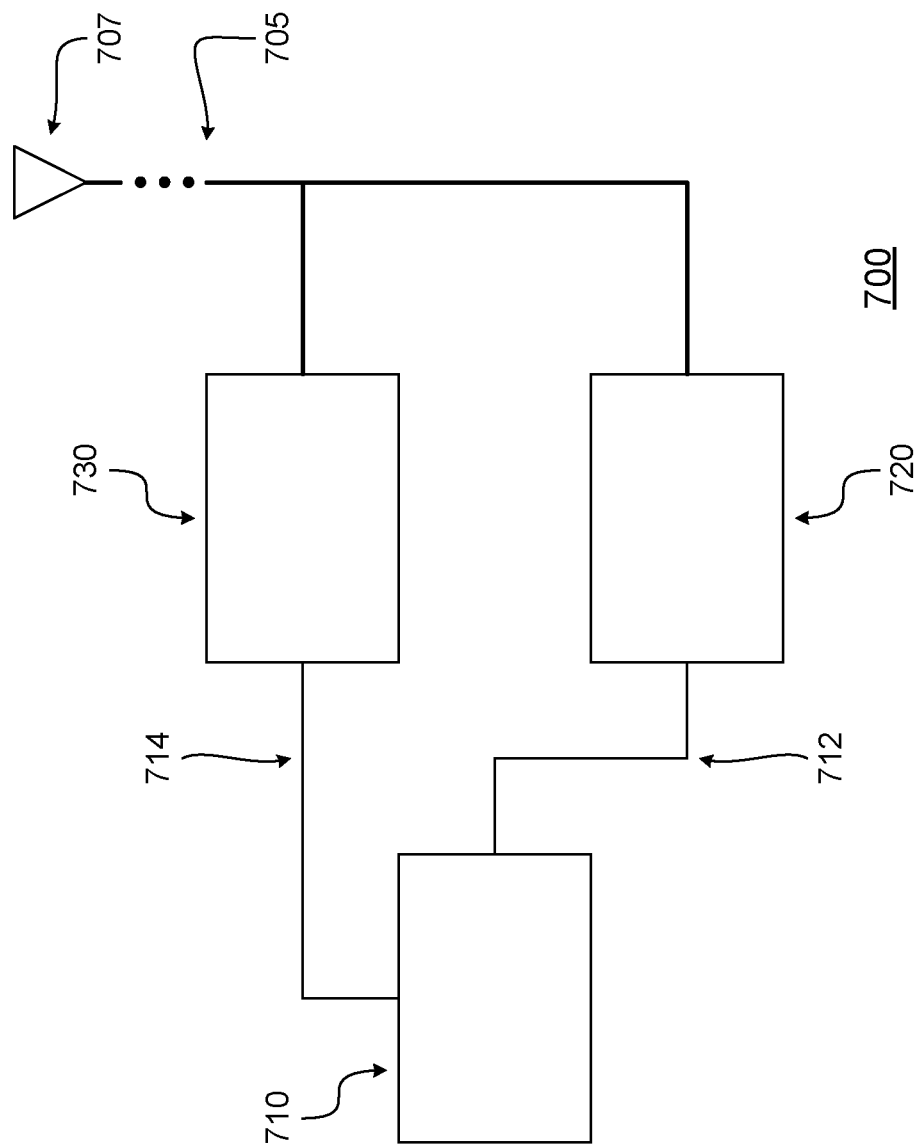
FIG. 7 illustrates hardware processing circuitries for an eNB for supporting TA for GUL, in accordance with some embodiments of the disclosure.

FIG. 7 illustrates hardware processing circuitries for an eNB for supporting TA for GUL, in accordance with some embodiments of the disclosure. With reference to FIG. 5, an eNB may include various hardware processing circuitries discussed herein (such as hardware processing circuitry 700 of FIG. 7), which may in turn comprise logic devices and/or circuitry operable to perform various operations. For example, in FIG. 5, eNB 510 (or various elements or components therein, such as hardware processing circuitry 520, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 516 (and/or one or more other processors which eNB 510 may comprise), memory 518, and/or other elements or components of eNB 510 (which may include hardware processing circuitry 520) may be arranged to perform the operations of these hardware processing circuitries, such as operations described herein with reference to devices and circuitry within these hardware processing circuitries. In some embodiments, processor 516 (and/or one or more other processors which eNB 510 may comprise) may be a baseband processor.

Returning to FIG. 7, an apparatus of eNB 510 (or another eNB or base station), which may be operable to communicate with one or more UEs on a wireless network, may comprise hardware processing circuitry 700. In some embodiments, hardware processing circuitry 700 may comprise one or more antenna ports 705 operable to provide various transmissions over a wireless communication channel (such as wireless communication channel 550). Antenna ports 705 may be coupled to one or more antennas 707 (which may be antennas 505). In some embodiments, hardware processing circuitry 700 may incorporate antennas 707, while in other embodiments, hardware processing circuitry 700 may merely be coupled to antennas 707.

Antenna ports 705 and antennas 707 may be operable to provide signals from an eNB to a wireless communications channel and/or a UE, and may be operable to provide signals from a UE and/or a wireless communications channel to an eNB. For example, antenna ports 705 and antennas 707 may be operable to provide transmissions from eNB 510 to wireless communication channel 550 (and from there to UE 530, or to another UE). Similarly, antennas 707 and antenna ports 705 may be operable to provide transmissions from a wireless communication channel 550 (and beyond that, from UE 530, or another UE) to eNB 510.

Hardware processing circuitry 700 may comprise various circuitries operable in accordance with the various embodiments discussed herein. With reference to FIG. 7, hardware processing circuitry 700 may comprise a first circuitry 710, a second circuitry 720, and/or a third circuitry 730.

First circuitry 710 may be operable to establish a first TA for SUL transmission. First circuitry 710 may also be operable to establish a second TA for GUL transmission. In some embodiments, first circuitry 710 may be operable to provide indicators of the first TA and/or the second TA to second circuitry 720 via an interface 712. Second circuitry 720 may be operable to process an SUL transmission at a timing based upon the first TA. Second circuitry 720 may also be operable to process a GUL transmission at a timing based upon the second TA. Hardware processing circuitry 700 may also comprise an interface for receiving the SUL transmission and the GUL transmission from a receiving circuitry.

In some embodiments, first circuitry 710 may be operable to establish the second TA based upon one or more parameters for GUL transmission. Third circuitry 730 may be operable to generate a configuration transmission to the UE carrying the one or more parameters for GUL transmission. First circuitry 710 may be operable to provide indicators of the one or more parameters for GUL transmission to third circuitry 730 via an interface 714.

In some embodiments, the configuration transmission may be a higher-layer signaling transmission. For some embodiments, the one or more parameters may comprise a common TA for GUL transmission. In some embodiments, the common TA for GUL transmission may have a value indicating 16 microseconds. For some embodiments, the common TA for GUL transmission may have a value indicating 25 microseconds.

In some embodiments, the GUL transmission may be processed within an acquired MCOT of the eNB, and the SUL transmission and the GUL transmission may be multiplexed within one subframe at different interlaces. For some embodiments, the GUL transmission may be processed within a gap of one MCOT of the eNB, and the second TA may be established to be the same as the first TA. In some embodiments, the GUL transmission may be processed outside an MCOT of the eNB, and the second TA may be established to be the same as the first TA. For some embodiments, the GUL transmission is processed within an acquired MCOT of the eNB; and a last OFDM symbol of a subframe of the GUL transmission is punctured to create a gap for an LBT procedure for a subsequent subframe.

In some embodiments, first circuitry 710, second circuitry 720, and/or third circuitry 730 may be implemented as separate circuitries. In other embodiments, first circuitry 710, second circuitry 720, and/or third circuitry 730 may be combined and implemented together in a circuitry without altering the essence of the embodiments.

Figure 8:
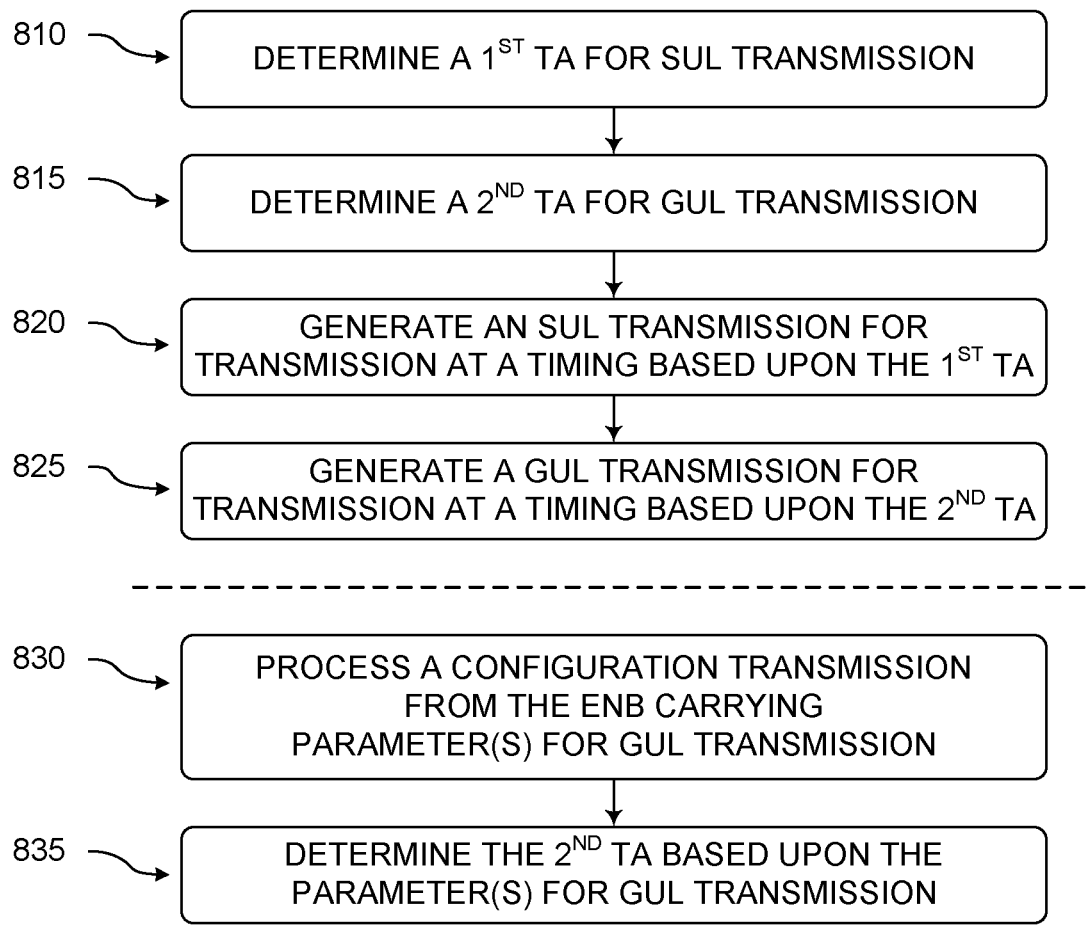
FIG. 8 illustrates methods for a UE for supporting TA for GUL, in accordance with some embodiments of the disclosure.

FIG. 8 illustrates methods for a UE for supporting TA for GUL, in accordance with some embodiments of the disclosure. With reference to FIG. 5, methods that may relate to UE 530 and hardware processing circuitry 540 are discussed herein. Although the actions in method 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 530 and/or hardware processing circuitry 540 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Regarding FIG. 8, various methods may be in accordance with the various embodiments discussed herein. A method 800 may comprise a determining 810, a determining 815, a generating 820, and a generating 825. Method 800 may also comprise a processing 830 and/or a determining 835.

In determining 810, a first TA for SUL transmission may be determined. In determining 815, a second TA for GUL transmission may be determined. In generating 820, an SUL transmission may be generated for transmission at a timing based upon the first TA. In generating 825, a GUL transmission may be generated for transmission at a timing based upon the second TA.

In some embodiments, in processing 830, a configuration transmission from the eNB carrying one or more parameters for GUL transmission may be processed. In determining 835, the second TA may be determined based upon the one or more parameters for GUL transmission.

For some embodiments, the configuration transmission may be a higher-layer signaling transmission. In some embodiments, the one or more parameters may comprise a common TA for GUL transmission. For some embodiments, the common TA for GUL transmission may have a value indicating 16 microseconds. In some embodiments, the common TA for GUL transmission may have a value indicating 25 microseconds.

In some embodiments, the GUL transmission may be generated for transmission within an acquired MCOT of the eNB, and the SUL transmission and the GUL transmission may be multiplexed within one subframe at different interlaces. For some embodiments, the GUL transmission may be generated for transmission within a gap of one MCOT of the eNB, and the second TA may be determined to be the same as the first TA. In some embodiments, the GUL transmission may be generated for transmission outside an MCOT of the eNB, and the second TA may be determined to be the same as the first TA. For some embodiments, the GUL transmission may be generated for transmission within an acquired MCOT of the eNB, and a last OFDM symbol of a subframe of the GUL transmission may be punctured to create a gap for an LBT procedure for a subsequent subframe.

Figure 9:
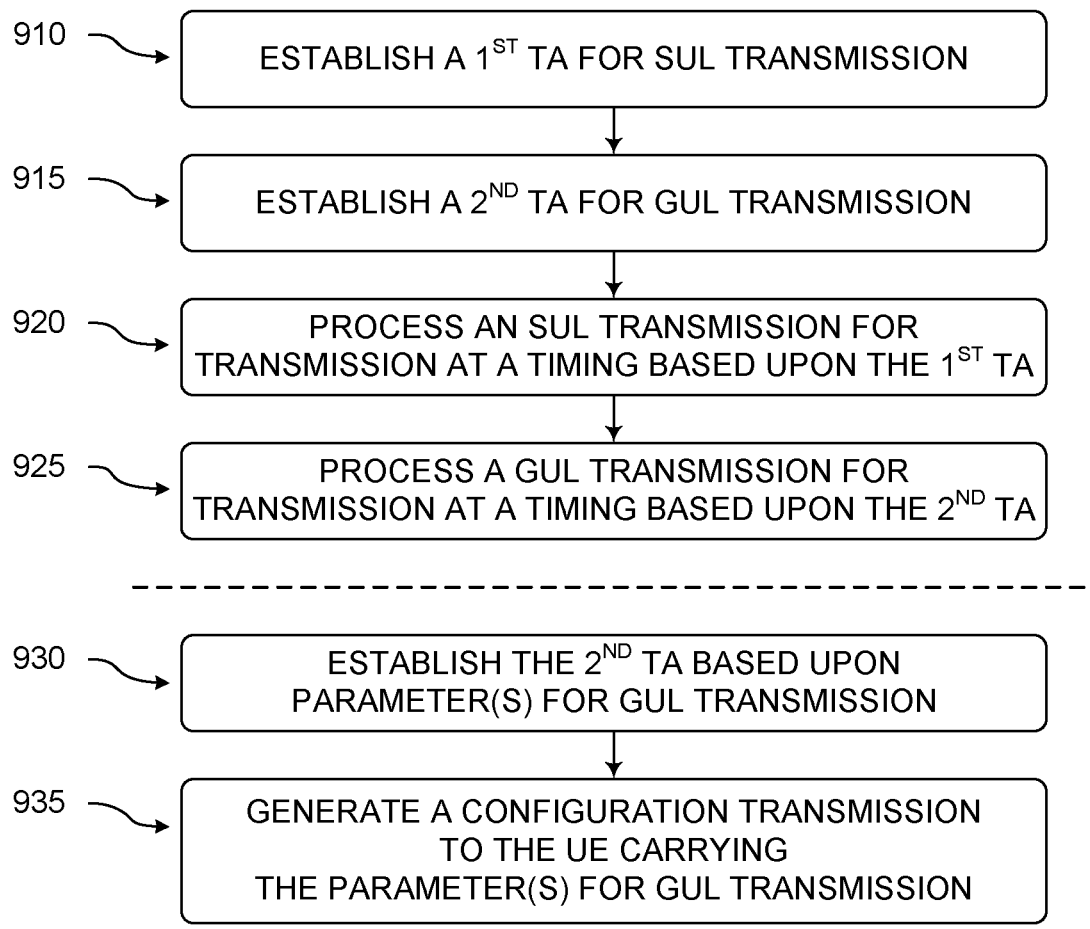
FIG. 9 illustrates methods for an eNB for supporting TA for GUL, in accordance with some embodiments of the disclosure.

FIG. 9 illustrates methods for an eNB for supporting TA for GUL, in accordance with some embodiments of the disclosure. With reference to FIG. 5, various methods that may relate to eNB 510 and hardware processing circuitry 520 are discussed herein. Although the actions in method 900 of FIG. 9 are shown in a particular order, the order of the actions can be modified. Thus, the illustrated embodiments can be performed in a different order, and some actions may be performed in parallel. Some of the actions and/or operations listed in FIG. 9 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 510 and/or hardware processing circuitry 520 to perform an operation comprising the methods of FIG. 9. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 9.

Regarding FIG. 9, various methods may be in accordance with the various embodiments discussed herein. A method 900 may comprise establishing 910, an establishing 915, a processing 920, and a processing 925. In various embodiments, method 800 may also comprise an establishing 930 and/or a generating 935.

In establishing 910, a first TA may be established for SUL transmission. In establishing 915, a second TA may be established for GUL transmission. In processing 920, an SUL transmission may be processed at a timing based upon the first TA. In processing 925, a GUL transmission may be processed at a timing based upon the second TA.

In some embodiments, in establishing 930, the second TA may be established based upon one or more parameters for GUL transmission. In generating 935, a configuration transmission to the UE carrying the one or more parameters for GUL transmission may be generated.

In some embodiments, the configuration transmission may be a higher-layer signaling transmission. For some embodiments, the one or more parameters may comprise a common TA for GUL transmission. In some embodiments, the common TA for GUL transmission may have a value indicating 16 microseconds.

In some embodiments, the GUL transmission may be processed within an acquired MCOT of the eNB, and the SUL transmission and the GUL transmission may be multiplexed within one subframe at different interlaces. For some embodiments, the GUL transmission may be processed within a gap of one MCOT of the eNB, and the second TA may be established to be the same as the first TA. In some embodiments, the GUL transmission may be processed outside an MCOT of the eNB, and the second TA may be established to be the same as the first TA. For some embodiments, the GUL transmission is processed within an acquired MCOT of the eNB; and a last OFDM symbol of a subframe of the GUL transmission is punctured to create a gap for an LBT procedure for a subsequent subframe.

Figure 10:
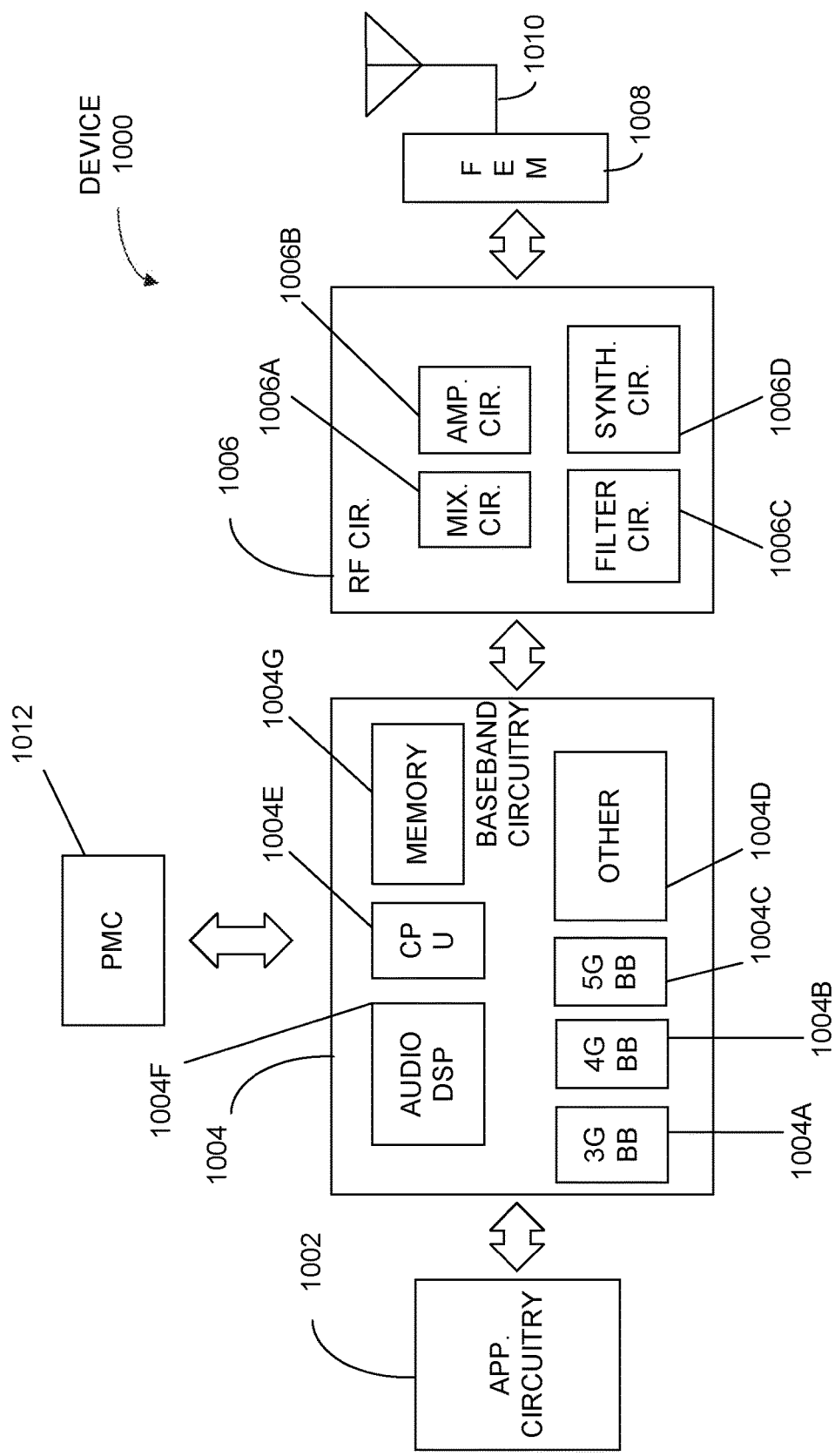
FIG. 10 illustrates example components of a device, in accordance with some embodiments of the disclosure.

FIG. 10 illustrates example components of a device, in accordance with some embodiments of the disclosure. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), sixth generation (6G), and so on). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, and so on. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, and so on to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006A, amplifier circuitry 1006B and filter circuitry 1006C. In some embodiments, the transmit signal path of the RF circuitry 1006 may include filter circuitry 1006C and mixer circuitry 1006A. RF circuitry 1006 may also include synthesizer circuitry 1006D for synthesizing a frequency for use by the mixer circuitry 1006A of the receive signal path and the transmit signal path. In some embodiments, the mixer circuitry 1006A of the receive signal path may be configured to down-convert RF signals received from the FEM circuitry 1008 based on the synthesized frequency provided by synthesizer circuitry 1006D. The amplifier circuitry 1006B may be configured to amplify the down-converted signals and the filter circuitry 1006C may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006A of the receive signal path may comprise passive mixers, although the scope of the embodiments is not limited in this respect.

In some embodiments, the mixer circuitry 1006A of the transmit signal path may be configured to up-convert input baseband signals based on the synthesized frequency provided by the synthesizer circuitry 1006D to generate RF output signals for the FEM circuitry 1008. The baseband signals may be provided by the baseband circuitry 1004 and may be filtered by filter circuitry 1006C.

In some embodiments, the mixer circuitry 1006A of the receive signal path and the mixer circuitry 1006A of the transmit signal path may include two or more mixers and may be arranged for quadrature downconversion and upconversion, respectively. In some embodiments, the mixer circuitry 1006A of the receive signal path and the mixer circuitry 1006A of the transmit signal path may include two or more mixers and may be arranged for image rejection (e.g., Hartley image rejection). In some embodiments, the mixer circuitry 1006A of the receive signal path and the mixer circuitry 1006A may be arranged for direct downconversion and direct upconversion, respectively. In some embodiments, the mixer circuitry 1006A of the receive signal path and the mixer circuitry 1006A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006D may be a fractional-N synthesizer or a fractional N/N+1 synthesizer, although the scope of the embodiments is not limited in this respect as other types of frequency synthesizers may be suitable. For example, synthesizer circuitry 1006D may be a delta-sigma synthesizer, a frequency multiplier, or a synthesizer comprising a phase-locked loop with a frequency divider.

The synthesizer circuitry 1006D may be configured to synthesize an output frequency for use by the mixer circuitry 1006A of the RF circuitry 1006 based on a frequency input and a divider control input. In some embodiments, the synthesizer circuitry 1006D may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006D of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC Idle state, where it disconnects from the network and does not perform operations such as channel quality feedback, handover, and so on. The device 1000 goes into a very low power state and it performs paging where again it periodically wakes up to listen to the network and then powers down again. The device 1000 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
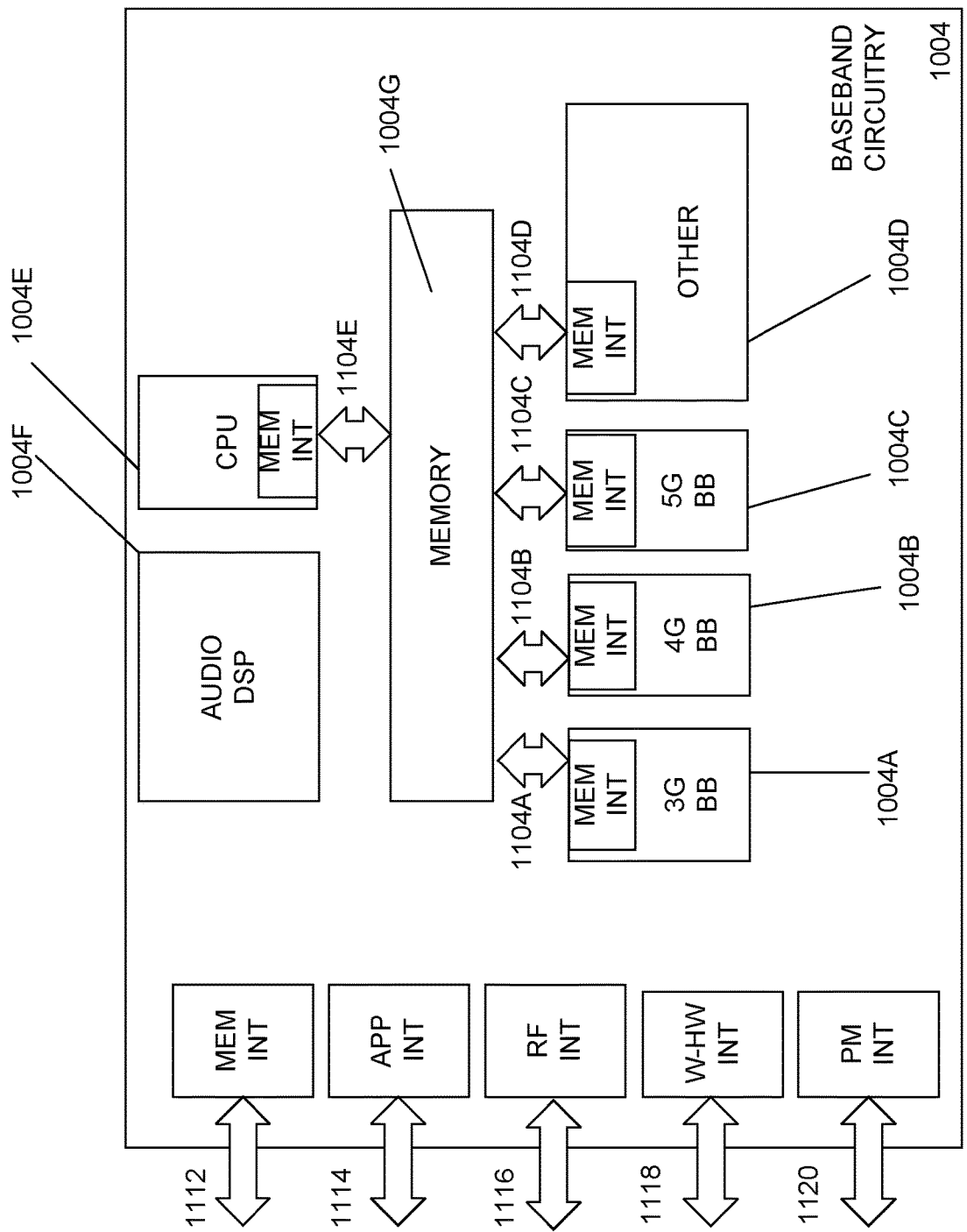
FIG. 11 illustrates example interfaces of baseband circuitry, in accordance with some embodiments of the disclosure.

FIG. 11 illustrates example interfaces of baseband circuitry, in accordance with some embodiments of the disclosure. As discussed above, the baseband circuitry 1004 of FIG. 10 may comprise processors 1004A-1004E and a memory 1004G utilized by said processors. Each of the processors 1004A-1004E may include a memory interface, 1104A-1104E, respectively, to send/receive data to/from the memory 1004G.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: determine a first Timing Advance (TA) for Scheduled Uplink (SUL) transmission; determine a second TA for Grantless Uplink (GUL) transmission; generate an SUL transmission for transmission at a timing based upon the first TA; and generate a GUL transmission for transmission at a timing based upon the second TA; and an interface for sending the SUL transmission and the GUL transmission to a transmission circuitry.

In example 2, the apparatus of example 1, wherein the one or more processors are to: process a configuration transmission from the eNB carrying one or more parameters for GUL transmission; and determine the second TA based upon the one or more parameters for GUL transmission.

In example 3, the apparatus of example 2, wherein the configuration transmission is a higher-layer signaling transmission.

In example 4, the apparatus of any of examples 1 through 3, wherein the one or more parameters comprise a common TA for GUL transmission.

In example 5, the apparatus of example 4, wherein the common TA for GUL transmission has a value indicating 16 microseconds.

In example 6, the apparatus of example 4, wherein the common TA for GUL transmission has a value indicating 25 microseconds.

In example 7, the apparatus of any of examples 1 through 6, wherein the GUL transmission is generated for transmission within an acquired Maximum Channel Occupancy Time (MCOT) of the eNB; and wherein the SUL transmission and the GUL transmission are multiplexed within one subframe at different interlaces.

In example 8, the apparatus of any of examples 1 through 6, wherein the GUL transmission is generated for transmission within a gap of one Maximum Channel Occupancy Time (MCOT) of the eNB; and wherein the second TA is determined to be the same as the first TA.

In example 9, the apparatus of any of examples 1 through 6, wherein the GUL transmission is generated for transmission outside a Maximum Channel Occupancy Time (MCOT) of the eNB; and wherein the second TA is determined to be the same as the first TA.

In example 10, the apparatus of any of examples 1 through 6, wherein the GUL transmission is generated for transmission within an acquired Maximum Channel Occupancy Time (MCOT) of the eNB; and wherein a last Orthogonal Frequency Division Multiplexing (OFDM) symbol of a subframe of the GUL transmission is punctured to create a gap for a Listen-Before-Talk (LBT) procedure for a subsequent subframe.

Example 11 provides a User Equipment (UE) device comprising an application processor, a memory, one or more antennas, a wireless interface for allowing the application processor to communicate with another device, and a touchscreen display, the UE device including the apparatus of any of examples 1 through 10.

Example 12 provides machine readable storage media having machine executable instructions that, when executed, cause one or more processors of a User Equipment (UE) operable to communicate with an Evolved Node-B (eNB) on a wireless network to perform an operation comprising: determine a first Timing Advance (TA) for Scheduled Uplink (SUL) transmission; determine a second TA for Grantless Uplink (GUL) transmission; generate an SUL transmission for transmission at a timing based upon the first TA; and generate a GUL transmission for transmission at a timing based upon the second TA.

In example 13, the machine readable storage media of example 12, the operation comprising: process a configuration transmission from the eNB carrying one or more parameters for GUL transmission; and determine the second TA based upon the one or more parameters for GUL transmission.

In example 14, the machine readable storage media of example 13, wherein the configuration transmission is a higher-layer signaling transmission.

In example 15, the machine readable storage media of any of examples 12 through 14, wherein the one or more parameters comprise a common TA for GUL transmission.

In example 16, the machine readable storage media of example 15, wherein the common TA for GUL transmission has a value indicating 16 microseconds.

In example 17, the machine readable storage media of example 15, wherein the common TA for GUL transmission has a value indicating 25 microseconds.

In example 18, the machine readable storage media of any of examples 12 through 17, wherein the GUL transmission is generated for transmission within an acquired Maximum Channel Occupancy Time (MCOT) of the eNB; and wherein the SUL transmission and the GUL transmission are multiplexed within one subframe at different interlaces.

In example 19, the machine readable storage media of any of examples 12 through 17, wherein the GUL transmission is generated for transmission within a gap of one Maximum Channel Occupancy Time (MCOT) of the eNB; and wherein the second TA is determined to be the same as the first TA.

In example 20, the machine readable storage media of any of examples 12 through 17, wherein the GUL transmission is generated for transmission outside a Maximum Channel Occupancy Time (MCOT) of the eNB; and wherein the second TA is determined to be the same as the first TA.

In example 21, the machine readable storage media of any of examples 12 through 17, wherein the GUL transmission is generated for transmission within an acquired Maximum Channel Occupancy Time (MCOT) of the eNB; and wherein a last Orthogonal Frequency Division Multiplexing (OFDM) symbol of a subframe of the GUL transmission is punctured to create a gap for a Listen-Before-Talk (LBT) procedure for a subsequent subframe.

Example 22 provides an apparatus of an Evolved Node B (eNB) operable to communicate with a User Equipment (UE) on a wireless network, comprising: one or more processors to: establish a first Timing Advance (TA) for Scheduled Uplink (SUL) transmission; establish a second TA for Grantless Uplink (GUL) transmission; process an SUL transmission at a timing based upon the first TA; and process a GUL transmission at a timing based upon the second TA; and an interface for receiving the SUL transmission and the GUL transmission from a receiving circuitry.

In example 23, the apparatus of example 22, wherein the one or more processors are to: establish the second TA based upon one or more parameters for GUL transmission; and generate a configuration transmission to the UE carrying the one or more parameters for GUL transmission.

In example 24, the apparatus of example 23, wherein the configuration transmission is a higher-layer signaling transmission.

In example 25, the apparatus of any of examples 22 through 24, wherein the one or more parameters comprise a common TA for GUL transmission.

In example 26, the apparatus of example 25, wherein the common TA for GUL transmission has a value indicating 16 microseconds.

In example 27, the apparatus of example 25, wherein the common TA for GUL transmission has a value indicating 25 microseconds.

In example 28, the apparatus of any of examples 22 through 27, wherein the GUL transmission is processed within an acquired Maximum Channel Occupancy Time (MCOT) of the eNB; and wherein the SUL transmission and the GUL transmission are multiplexed within one subframe at different interlaces.

In example 29, the apparatus of any of examples 22 through 27, wherein the GUL transmission is processed within a gap of one Maximum Channel Occupancy Time (MCOT) of the eNB; and wherein the second TA is established to be the same as the first TA.

In example 30, the apparatus of any of examples 22 through 27, wherein the GUL transmission is processed outside a Maximum Channel Occupancy Time (MCOT) of the eNB; and wherein the second TA is established to be the same as the first TA.

In example 31, the apparatus of any of examples 22 through 27, wherein the GUL transmission is processed within an acquired Maximum Channel Occupancy Time (MCOT) of the eNB; and wherein a last Orthogonal Frequency Division Multiplexing (OFDM) symbol of a subframe of the GUL transmission is punctured to create a gap for a Listen-Before-Talk (LBT) procedure for a subsequent subframe.

Example 32 provides an Evolved Node B (eNB) device comprising an application processor, a memory, one or more antenna ports, and an interface for allowing the application processor to communicate with another device, the eNB device including the apparatus of any of examples 22 through 31.

Example 33 provide machine readable storage media having machine executable instructions that, when executed, cause one or more processors of an Evolved Node B (eNB) operable to communicate with a User Equipment (UE) on a wireless network to perform an operation comprising: establish a first Timing Advance (TA) for Scheduled Uplink (SUL) transmission; establish a second TA for Grantless Uplink (GUL) transmission; process an SUL transmission at a timing based upon the first TA; and process a GUL transmission at a timing based upon the second TA.

In example 34, the machine readable storage media of example 33, the operation comprising: establish the second TA based upon one or more parameters for GUL transmission; and generate a configuration transmission to the UE carrying the one or more parameters for GUL transmission.

In example 35, the machine readable storage media of example 34, wherein the configuration transmission is a higher-layer signaling transmission.

In example 36, the machine readable storage media of any of examples 33 through 35, wherein the one or more parameters comprise a common TA for GUL transmission.

In example 37, the machine readable storage media of example 36, wherein the common TA for GUL transmission has a value indicating 16 microseconds.

In example 38, the machine readable storage media of example 36, wherein the common TA for GUL transmission has a value indicating 25 microseconds.

In example 39, the machine readable storage media of any of examples 33 through 38, wherein the GUL transmission is processed within an acquired Maximum Channel Occupancy Time (MCOT) of the eNB; and wherein the SUL transmission and the GUL transmission are multiplexed within one subframe at different interlaces.

In example 40, the machine readable storage media of any of examples 33 through 38, wherein the GUL transmission is processed within a gap of one Maximum Channel Occupancy Time (MCOT) of the eNB; and wherein the second TA is established to be the same as the first TA.

In example 41, the machine readable storage media of any of examples 33 through 38, wherein the GUL transmission is processed outside a Maximum Channel Occupancy Time (MCOT) of the eNB; and wherein the second TA is established to be the same as the first TA.

In example 42, the machine readable storage media of any of examples 33 through 38, wherein the GUL transmission is processed within an acquired Maximum Channel Occupancy Time (MCOT) of the eNB; and wherein a last Orthogonal Frequency Division Multiplexing (OFDM) symbol of a subframe of the GUL transmission is punctured to create a gap for a Listen-Before-Talk (LBT) procedure for a subsequent subframe.

In example 43, the apparatus of any of examples 1 through 10, and 22 through 31, wherein the one or more processors comprise a baseband processor.

In example 44, the apparatus of any of examples 1 through 10, and 22 through 31, comprising a memory for storing instructions, the memory being coupled to the one or more processors.

In example 45, the apparatus of any of examples 1 through 10, and 22 through 31, comprising a transceiver circuitry for at least one of: generating transmissions, encoding transmissions, processing transmissions, or decoding transmissions.

In example 46, the apparatus of any of examples 1 through 10, and 22 through 31, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station (BS) on a wireless network, comprising:
   one or more processors to:
      determine a first Timing Advance (TA) for Scheduled Uplink (SUL) transmission;
      determine a second TA for Grantless Uplink (GUL) transmission based at least in part on a timing of a maximum channel occupancy time (MCOT) acquired by the BS;
      generate an SUL transmission for transmission at a timing based upon the first TA; and
      generate a GUL transmission for transmission at a timing based upon the second TA; and
   an interface for sending the SUL transmission and the GUL transmission to a transmission circuitry.

2. The UE of claim 1, wherein the one or more processors are to:
   process a configuration transmission from the BS carrying one or more parameters for GUL transmission; and
   determine the second TA based upon the one or more parameters for GUL transmission.

3. The UE of claim 2, wherein the configuration transmission is a higher-layer signaling transmission.

4. The UE of claim 2, wherein the one or more parameters comprise a common TA for GUL transmission.

5. The UE of claim 4, wherein the common TA for GUL transmission has a value indicating 16 microseconds.

6. The UE of claim 4, wherein the common TA for GUL transmission has a value indicating 25 microseconds.

7. The UE of claim 1, wherein the GUL transmission is performed within the MCOT acquired by the BS.

8. The UE of claim 7, where in the second TA for GUL transmission is smaller than the first TA for SUL transmission.

9. A non-transitory computer readable medium having machine executable instructions that, when executed, cause one or more processors of a User Equipment (UE) operable to communicate with a base station (BS) on a wireless network to perform operations comprising:
   determining a first Timing Advance (TA) for Scheduled Uplink (SUL) transmission;
   determining a second TA for Grantless Uplink (GUL) transmission based at least in part on a timing of a maximum channel occupancy time (MCOT) acquired by the BS;
   generating an SUL transmission for transmission at a timing based upon the first TA; and
   generating a GUL transmission for transmission at a timing based upon the second TA.

10. The non-transitory computer readable medium of claim 9, the operations further comprising:
   processing a configuration transmission from the BS carrying one or more parameters for GUL transmission; and
   determining the second TA based upon the one or more parameters for GUL transmission.

11. The non-transitory computer readable medium of claim 10, wherein the configuration transmission is a higher-layer signaling transmission.

12. The non-transitory computer readable medium of claim 10, wherein the one or more parameters comprise a common TA for GUL transmission.

13. The non-transitory computer readable medium of claim 12, wherein the common TA for GUL transmission has a value indicating 16 microseconds.

14. The non-transitory computer readable medium of claim 12, wherein the common TA for GUL transmission has a value indicating 25 microseconds.

15. An apparatus of an Evolved Node B (eNB) A base station (BS) operable to communicate with a User Equipment (UE) on a wireless network, comprising:
one or more processors to:
establish a first Timing Advance (TA) for Scheduled Uplink (SUL) transmission;
establish a second TA for Grantless Uplink (GUL) transmission based at least in part on a timing of a maximum channel occupancy time (MCOT) acquired by the BS;
process an SUL transmission at a timing based upon the first TA; and
process a GUL transmission at a timing based upon the second TA; and
an interface for receiving the SUL transmission and the GUL transmission from a receiving circuitry.

16. The BS of claim 15, wherein the one or more processors are to:
establish the second TA based upon one or more parameters for GUL transmission; and
generate a configuration transmission to the UE carrying the one or more parameters for GUL transmission.

17. The BS of claim 16, wherein the configuration transmission is a higher-layer signaling transmission.

18. The BS of claim 16, wherein the one or more parameters comprise a common TA for GUL transmission.

19. The BS of claim 18, wherein the common TA for GUL transmission has a value indicating 16 microseconds.

20. The BS of claim 18, wherein the common TA for GUL transmission has a value indicating 25 microseconds.

21. A non-transitory computer readable medium having machine executable instructions that, when executed, cause one or more processors of a base station (BS) operable to communicate with a User Equipment (UE) on a wireless network to perform operations comprising:
establishing a first Timing Advance (TA) for Scheduled Uplink (SUL) transmission;
establishing a second TA for Grantless Uplink (GUL) transmission based at least in part on a timing of a maximum channel occupancy time (MCOT) acquired by the BS;
processing an SUL transmission at a timing based upon the first TA; and
processing a GUL transmission at a timing based upon the second TA.

22. The non-transitory computer readable medium of claim 21, the operations further comprising:
establishing the second TA based upon one or more parameters for GUL transmission; and
generating a configuration transmission to the UE carrying the one or more parameters for GUL transmission.

23. The non-transitory computer readable medium of claim 22, wherein the configuration transmission is a higher-layer signaling transmission.

24. The non-transitory computer readable medium of claim 22, wherein the one or more parameters comprise a common TA for GUL transmission.

* * * * *